May 2, 1933. H. A. NEBEL ET AL 1,907,263
WEIGHING DEVICE FOR VEHICLES
Filed July 24, 1931 2 Sheets-Sheet 1
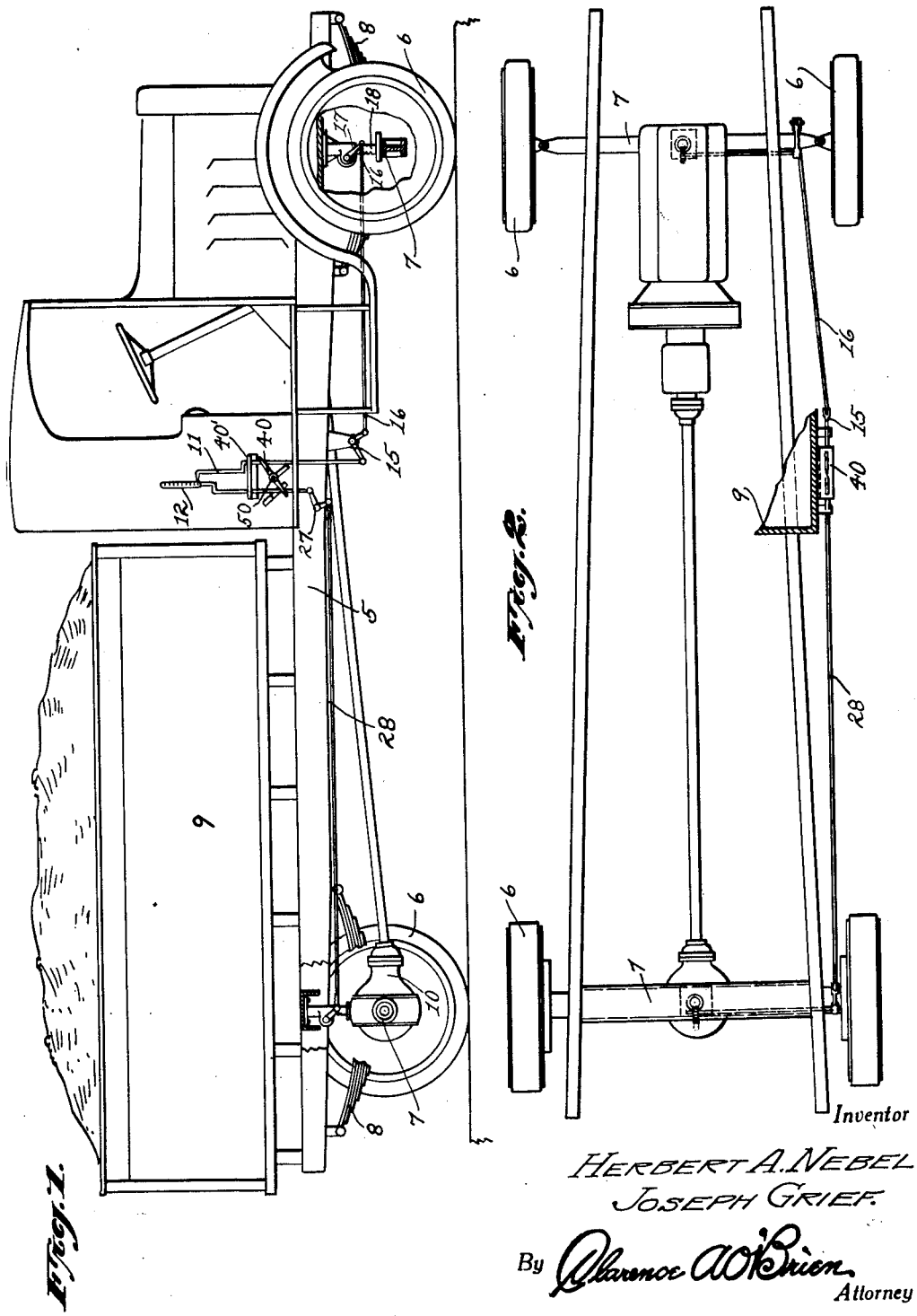
Inventor
HERBERT A. NEBEL.
JOSEPH GRIEF.
By Clarence A. O'Brien
Attorney May 2, 1933. H. A. NEBEL ET AL 1,907,263
WEIGHING DEVICE FOR VEHICLES
Filed July 24, 1931 2 Sheets-Sheet 2
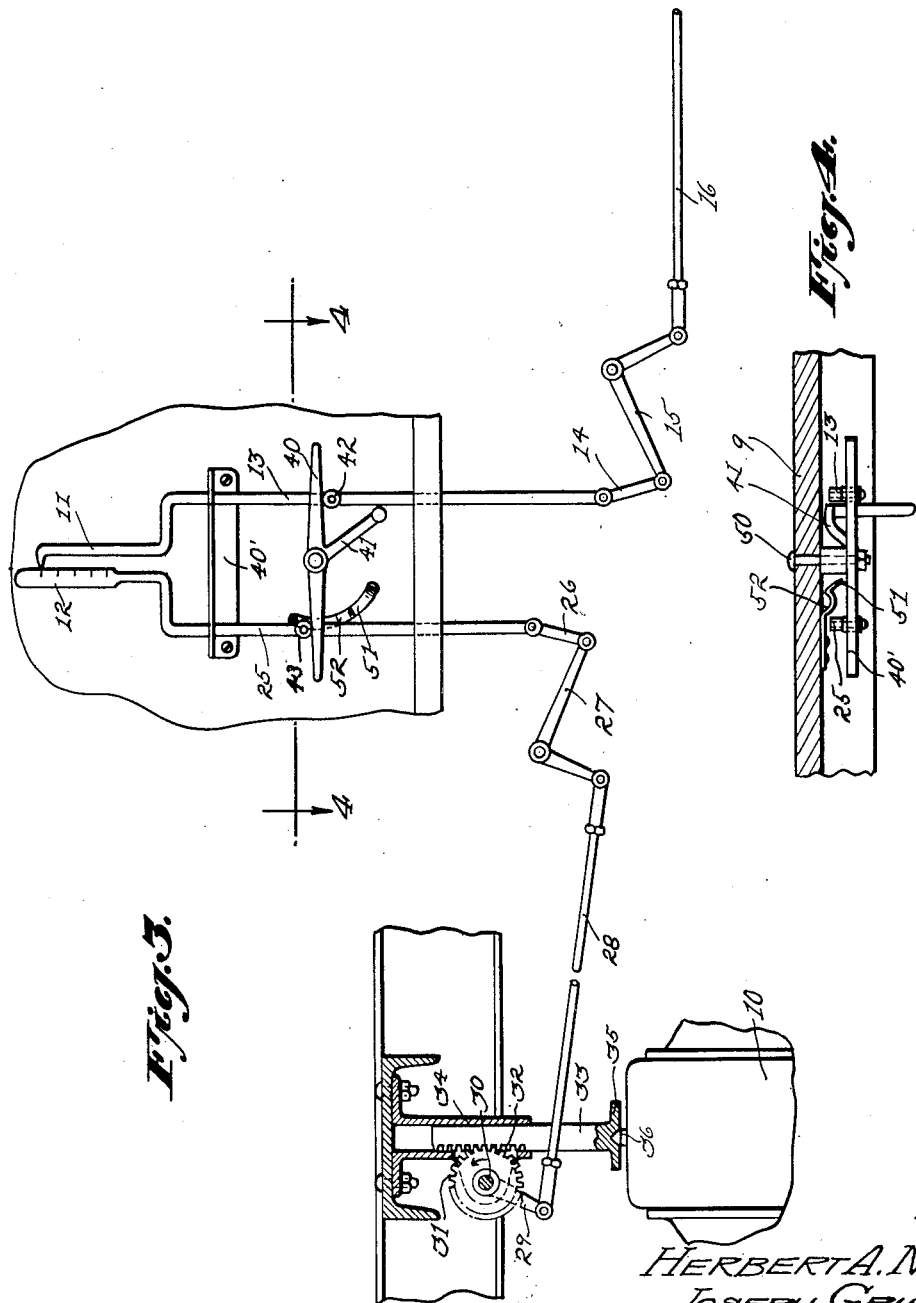
Inventor
HERBERT A. NEBEL
JOSEPH GRIEF
By Clarence A. O'Brien
Attorney Patented May 2, 1933

1,907,263

UNITED STATES PATENT OFFICE

HERBERT A. NEBEL AND JOSEPH GRIEF, OF AMSTERDAM, NEW YORK

WEIGHING DEVICE FOR VEHICLES

Application filed July 24, 1931. Serial No. 552,982.

The present invention relates to new and useful improvements in weighing devices, and more particularly pertains to a weighing device for vehicles.

In the present embodiment of the invention, it has been illustrated in combination with a motor truck, but it is to be understood that the invention is not limited to use solely with motor trucks, but is capable of use in combination with any type of vehicle wherein a body is resiliently supported upon wheels and axles or the like.

It is an object of the present invention to provide means whereby the load carried by a vehicle may be indicated upon the vehicle without the use of scales such as platform scales and the like.

It is a further object of the invention so to construct a device of this character that an accurate reading or indication of the load carried may be had.

Still another object of the invention resides in the provision of means whereby the weight indicating mechanism may be rendered inoperative at will.

With the above and other objects in view, reference will be had to the accompanying drawings illustrating the invention in a preferred form, and in which;

Figure 1 is a view in side elevation illustrating a motor truck equipped with a weight indicating mechanism constructed in accordance with the present invention, Figure 2 is a top plan view of the truck chassis, Figure 3 is a fragmentary view in elevation on an enlarged scale illustrating the weight or load indicating mechanism, and Figure 4 is a detail horizontal sectional view taken on the line 4—4 of Figure 3.

Referring more particularly to the drawings, the reference character 5 designates the truck chassis and said chassis is supported on wheels 6 by means of axles 7 and springs 8. The body 9 is suitably supported upon the chassis 5 in the conventional manner, and is therefore, resiliently carried by the axles 7. The rear axle 7 is provided with the conventional differential housing 10 and as thus far described, the truck may be of conventional construction.

In carrying out the present invention, I provide two indicators 11 and 12. These indicators are so constructed and arranged as to operate together and move in opposite direction. The indicator 11 is carried by the upper end of a rod or the like 13 the lower end of which is connected by means of a link 14 to a bell crank lever 15 which in turn is connected to a rod 16. This rod 16 is connected at its forward end to a crank 17 and this crank is carried by a shaft which in turn carries a gear meshing with a vertically disposed rack 18 the lower end of which rests upon the front axle 7.

The indicator 12 is carried upon the upper end of a rod 25 the lower end of which is connected by means of a link 26 with a bell crank lever 27 which in turn is connected by a rod or the like 28 with a crank arm 29. The crank arm 29 is attached to a shaft 30 and said shaft 30 carries a gear 31 which meshes with rack teeth 32 upon a vertically disposed plunger or the like 33. The plunger 33 is operable in a suitable housing 34 and its lower end is socketed as at 35 to receive a projecting lug or the like 36 upon the top of the differential housing 10.

The rods 13 and 25 and the indicators 11 and 12 may be mounted at any desirable location upon the vehicle body, and the rods are guided in their movement by means of a flanged guide plate or the like 40′ through which the rods extend.

From the foregoing it will be apparent that as the springs 8 of the body are flexed due to the placing of a load therein, the body will move downwardly. In its movement downwardly, the housing 34 and the gear 31 will be carried with the same and by reason of the engagement of the gear with the rack teeth 32, the rack 33 resting upon the axle or differential housing, the gear will be rotated in a maner to move the lever 29 to the right in Figure 3 and through the medium of the rod 28, bell crank 27, link 26, and rod 25, the indicator 12 will be moved upwardly in said figure.

In a similar manner, as the body moves downwardly the rod 16 will be operated through the medium of its crank 17 and through the medium of the bell crank lever 15, link 14 and rod 13, the indicator 11 will be moved upwardly. Thus it will be noted that the indicating means 11 and 12 move in opposite direction to indicate the weight of the load carried by the body.

Means is provided to render the weight indicating mechanism inoperative, and this means consists of a lever or the like 40 pivotally mounted as at 50 and operated about its pivotal point by means of a crank or the like 41. The rod 13 carries a roller or the like 42 and a similar roller or the like 43 is carried by the rod 25. The lever 40 is so positioned with respect to the rollers 42 and 43 that it occupies a position above the former and below the latter in such a manner that as the lever 40 is rocked about its pivotal point, the rod 13 will be depressed and the rod 25 will be elevated. Depression of the rod 13 and elevation of the rod 25 moves their respective rack members or plungers into their respective housing and out of engagement with their respective axle in such a manner that movement of the body will not effect a movement of the indicating means.

To retain the parts in this position, a resilient member 51 is provided, and this member has a recess or the like 52 which is adapted to receive the crank 41 when the same is moved to the left in Figure 3 and to retain the same in its moved position and thus holds the indicating mechanism out of operative relation with the body of the vehicle.

From the foregoing it is apparent that the present invention provides a new and novel mechanism for indicating the loads of vehicles in which the body is resiliently mounted and furthermore, the invention provides for rendering the device inoperative.

While the invention has been described in a preferred form, it is to be understood that the invention is not to be limited to the specific construction herein shown, and that it may be practiced in other forms without departing from the spirit thereof.

Having thus described the invention, what is claimed as new and what it is desired to secure by Letters Patent of the United States, is:—

1. In combination, a vehicle body, supporting axles therefor, springs for supporting said body on said axles, means for indicating the sum of movement of the body relative to each of the supporting axles, and means for rendering said indicating means inoperative.

2. In combination with a vehicle having supporting axles and a body resiliently supported thereon, a pair of integrating indicator members, there being one for each of said axles, plungers carried by the body and positioned over each of said axles to be operated thereby, and means for operating said indicator members from said plungers.

3. In combination with a vehicle having supporting axles and a body resiliently supported thereon, coacting indicating means for indicating the sum of movement of the ends of the body relatively to its axles, means operated by the axles for operating their respective indicating means, and manually operated means for rendering said indicator operating means inoperative.

4. In combination with a vehicle having supporting axles and a body resiliently supported thereon, coacting indicating means for indicating the sum of movement of the ends of the body relatively to its axles, means operated by the axles for operating their respective indicating means, and manually operated means for rendering said indicator operating means inoperative, and for holding same in its inoperative position.

In testimony whereof we affix our signatures.

HERBERT A. NEBEL.
JOSEPH GRIEF.